Dec. 27, 1955    E. J. BROWN    2,728,584
WHEELBARROW CONVERTIBLE TO A CART
Filed Jan. 23, 1953    2 Sheets-Sheet 1
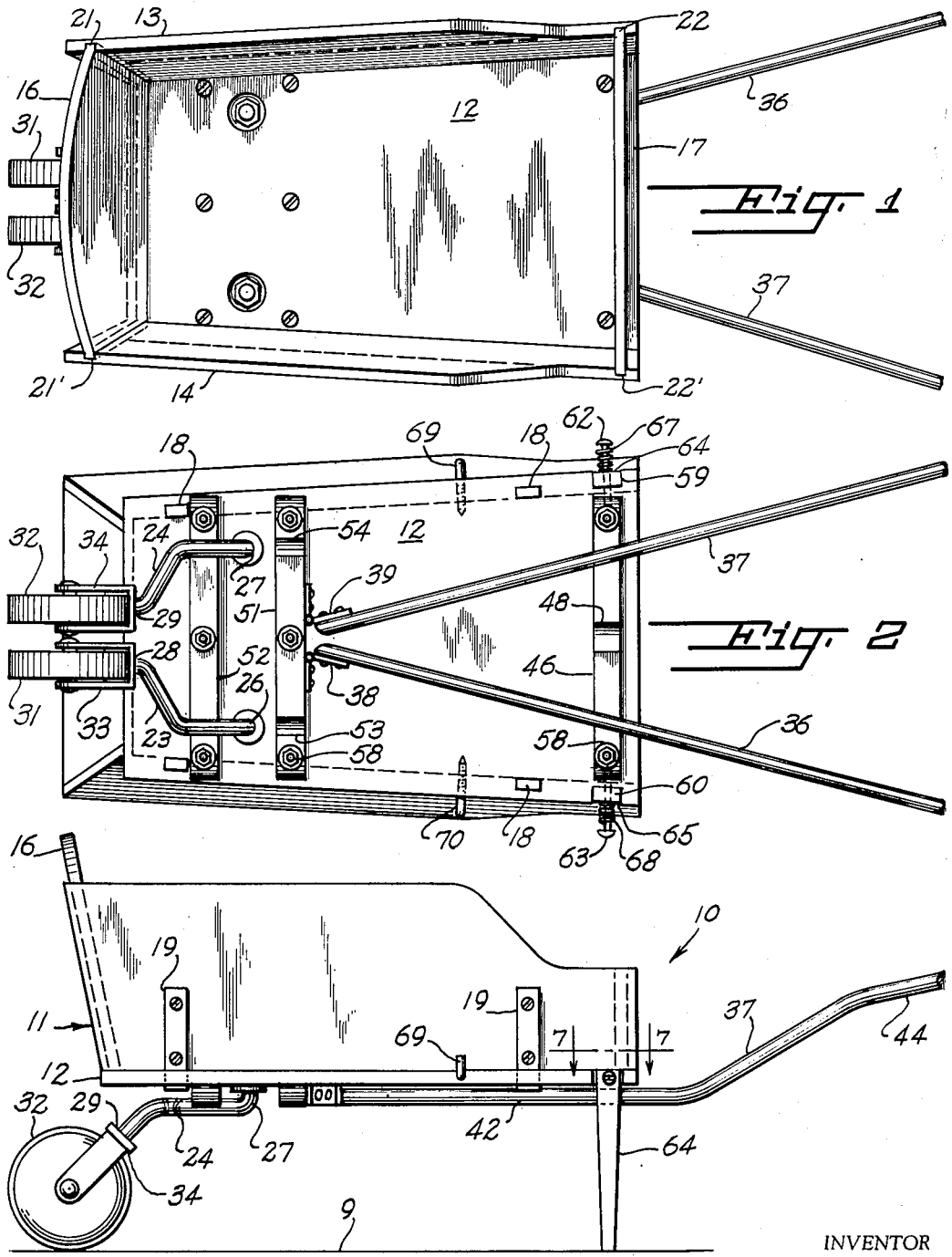
INVENTOR
Ernest J. Brown
BY
McMorrow, Berman + Davidson
ATTORNEY Dec. 27, 1955    E. J. BROWN    2,728,584
WHEELBARROW CONVERTIBLE TO A CART
Filed Jan. 23, 1953    2 Sheets-Sheet 2
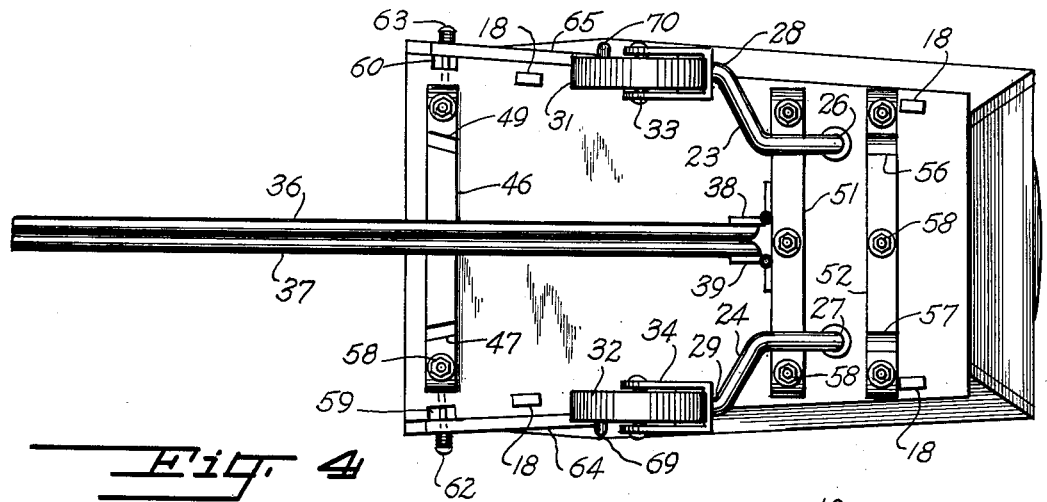
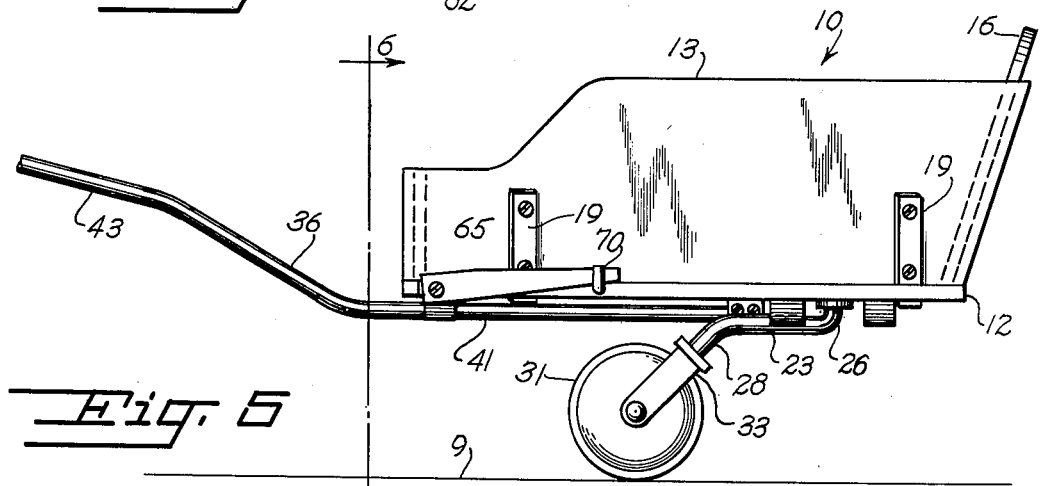
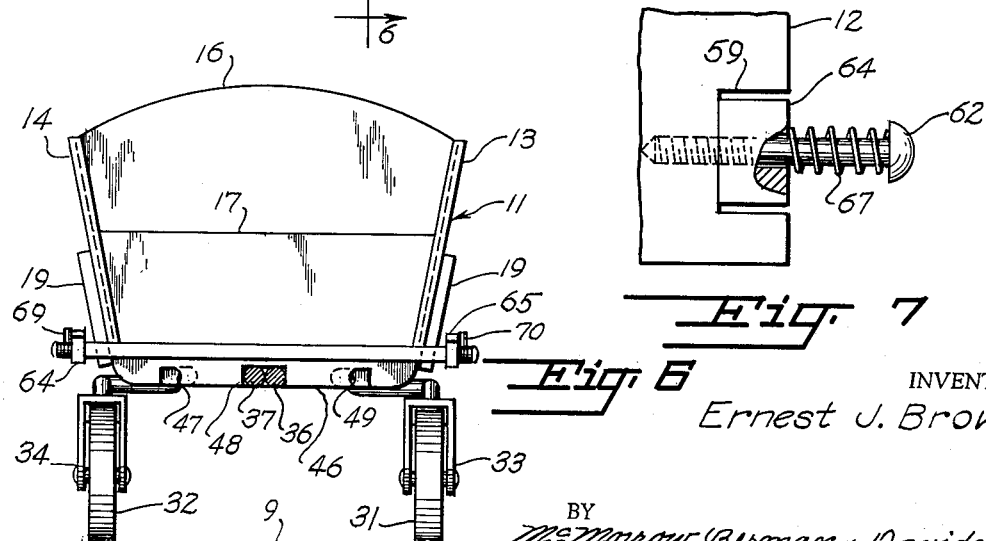
INVENTOR
Ernest J. Brown
BY
McMorrow, Berman & Davidson
ATTORNEY

United States Patent Office 2,728,584
Patented Dec. 27, 1955

2,728,584

WHEELBARROW CONVERTIBLE TO A CART

Ernest J. Brown, Detroit, Mich.

Application January 23, 1953, Serial No. 332,917

4 Claims. (Cl. 280—47.26)

This invention pertains to a mobile carrier and, in particular, to a carrier of the wheelbarrow or cart type.

An object of this invention is to provide a mobile carrier in which the wheels may be selectively positioned to make the carrier a wheelbarrow or cart, alternatively.

Another object of this invention is to provide a carrier which is convertible from a wheelbarrow to a cart and which has handle means adjustable to serve as handles for a wheelbarrow or as a draw bar for a cart.

Other objects and advantages will become apparent from a consideration of the following description taken in view of the drawings.

In the drawings:

Figure 1 is a top view of the invention when in the wheelbarrow form.

Figure 2 is a bottom view of the device of Figure 1.

Figure 3 is an elevational view of the device of Figure 1.

Figure 4 is a bottom view of the invention when in the form of a cart.

Figure 5 is an elevational view of the device of Figure 4.

Figure 6 is an elevational view taken along the line 6—6 of Figure 5.

Figure 7 is an enlarged view taken along line 7—7 of Figure 3 with a portion in cross section.

Referring now more specifically to the drawings wherein like reference numerals are used throughout, the numeral 10 indicates generally a mobile carrier for traversing a ground surface constructed according to the present invention. The carrier 10 has a container 11 of the conventional wheelbarrow type; such container having a bottom 12, side panels 13 and 14, and end panels 16 and 17. The bottom 12 is provided with spaced openings 18 adjacent the side edges for slidably receiving the projecting ends of the corresponding stakes 19 carried by the side panels 13 and 14. The end panels 16 and 17 are slidably supported in grooves 21, 21' and 22, 22' formed in side panels 13 and 14 respectively, Figure 1. When in the above described positions, the side panels 13, 14 and end panels 16, 17 rest upon the bottom 12.

Two spaced upstanding arms 23 and 24 are arranged below the container 11 intermediate the ends thereof and each has its upper end portion 26 and 27, respectively, connected to the bottom 12 of the container 11 for pivotal movement about a vertical axis. The complemental lower end portions 28 and 29 of the arms 23, 24, respectively, are offset horizontally both longitudinally and laterally with respect to the upper end portions 26, 27, Figure 2 and Figure 4; the lower end portions 28, 29 extend in substantially opposite directions with respect to each other and are thereby positioned contiguous to the adjacent side edges of the bottom 12 intermediate the ends of the latter, Figure 4. Wheels 31 and 32 are journaled in yokes 33 and 34 carried by the lower end portions 28, 29 of the arms 23, 24 respectively. The lower end portions 28, 29 of the arms together with the wheels 31, 32 are movable from the position contiguous to the side edges of the bottom 12, Figure 4, to a juxtaposed position substantially centrally of the side panels 13 and 14 adjacent one end, viz., the end supporting the end panel 16, Figure 2.

Handle means are carried by the container 11 and include a pair of longitudinally extending rods 36 and 37 which are arranged in side by side relation below the container 11, Figure 4. Each of the rods 36, 37 has one end pivotally connected to the container 11 intermediate the ends of the latter by hinges 38 and 39, respectively, for swinging movement from the side by side position, Figure 4, to a diverging position, Figure 2. The rods 36 and 37 are formed with substantially straight lower end portions 41 and 42; the upper end portions 43 and 44 being offset vertically with respect to the lower end portions in order to make the rods easy to grasp and control.

A first holding means is carried by the container 11 adjacent the other end, viz., the end supporting the panel 17, such holding means being selectively engageable with the rods 36, 37 for holding the rods in the side by side position or in the diverging position. The holding means embodies a bar 46 which is arranged transversely of and below the container 11 and is secured to the bottom 12 adjacent the end supporting the panel 17. The bar 46 is provided with spaced notches 47, 48, and 49, Figure 6; notch 48 being substantially twice the width of notches 47 and 49. Thus, the notches 47 and 49 provide seats for the rods 36 and 37 when in the spaced apart or diverging position and the notch 48 provides a collective seat for the rods 36, 37 when in the side by side position.

A second holding means is carried by the container 11 intermediate the ends thereof and is selectively engageable with the arms 23 and 24 for holding the lower end portions 28 and 29 of the latter in the position contiguous to the side edges of the bottom 12 or in the juxtaposed position. The second holding means embodies a pair of spaced parallel bars 51 and 52 which are arranged transversely of and below the container 11 and are secured to the bottom 12 on opposite sides of the upper end portions 26, 27 of the arms 23, 24. The bar 51 is formed with notches 53 and 54 adjacent the ends thereof which provide seats for the portion of the arms 23, 24 intermediate the upper and lower ends when the lower end portions 28, 29 are in the position intermediate the ends of the container adjacent the side edges of the bottom 12, Figure 4. The bar 52 is formed with notches 56 and 57 adjacent the ends thereof which provide seats for the portion of the arms 23, 24 intermediate the upper and lower ends when the lower ends 28, 29 are in the juxtaposed position, Figure 2. The sides of the notches 47 and 49 remote from the adjacent ends of the bar 46 are conformably shaped to receive the arms 36 and 37. The bars 46, 51 and 52 are secured to the bottom 12 by fasteners 58 which are countersunk to permit the unhindered swinging and pivotal movements of the arms 23, 24 and the rods 36, 37.

The bottom 12 is provided with vertically extending grooves 59 and 60 on opposite sides thereof contiguous to the end supporting the panel 17. Positioned centrally of the grooves 59, 60 and projecting transversely therefrom are headed studs 62 and 63 respectively. Drop legs 64 and 65 have one end slidably supported on the studs 62, 63 and are biased into position within the corresponding grooves 59 and 60 by the coil springs 67 and 68 encircling the portions of the studs intermediate the heads thereof and the outer faces of the drop legs 64 and 65. When the legs 64, 65 are positioned within the grooves 59, 60, the other ends thereof are engageable with a ground surface 9 for supporting the container 11 in a spaced position thereabove, Figure 3. The legs 64, 65 are movable from the ground-engaging position, Figure 3, to a position out of engagement with the ground surface 9, Figure 5, wherein the ground-engaging ends of the legs 64, 65 are supported by keepers 69 and 70 projecting from the bottom 12.

In operation, the mobile carrier 10 may be used as a wheelbarrow, Figures 1 to 3, wherein: the lower end portions 28, 29 of the arms 23, 24 and wheels 31, 32 are juxtaposed substantially centrally of the container 11 adjacent the end which supports the panel 16; the arms 23, 24 are seated in the notches 56, 57 of the bar 52; the rods 36, 37 are arranged in diverging relation and seated in the notches 47, 49; and the legs 64, 65 are in the depending ground-engaging position within the grooves 59, 60, as shown in Figure 3.

When it is desired to convert the carrier 10 into a cart, Figures 4 to 6: the arms 23, 24 are swung about their vertical axes until they are seated in the notches 53, 54; the lower end portions 28 and 29 of the arms 23, 24 along with the wheels 31, 32 are positioned intermediate the ends of the container contiguous to the sides thereof; the rods 36, 37 are placed side by side and seated in the notch 48 of the bar 46; and the legs 64, 65 are swung out of engagement with the ground surface 9 and are supported by the keepers 69 and 70.

It is desirable to fabricate the rods 36, 37 and the arms 23, 24 of suitable material, such as spring steel, to achieve the necessary flexibility therein to position and reposition the arms and axles within the notches. Further, in order to facilitate the conversion of the carrier from a wheelbarrow to a cart and from a cart to a wheelbarrow, the edges of the notches should be rounded, the notches should not be deep, and the ends of the bars 46, 47, and 48 should also be rounded.

While the carrier 10 has been described as a device of general utility, its design is also favorably suited to the construction of a toy containing the same novel features.

What is claimed is:

1. A mobile carrier for traversing a ground surface comprising a container, at least two spaced upstanding arms arranged below said container intermediate the ends thereof and each having the upper end connected to said container for pivotal movement about a vertical axis and each having the lower end portion positioned contiguous to the adjacent side of said container intermediate the ends thereof, said lower end portions being spaced apart, a wheel journaled in the lower end portions of said arms and movable with said lower end portions from the spaced apart position contiguous to the sides of said container to a juxtaposed position adjacent one end of the latter, holding means carried by said container intermediate the ends thereof for holding the lower end portions of said arms in the spaced apart position or in the juxtaposed position, said holding means comprising a bar arranged transversely of and carried by the under surface of said container adjacent said one end thereof and having means thereon engageable with adjacent portions of said arms when the lower end portions of said arms are in the juxtaposed position, and another bar arranged transversely of and carried by the under surface of said container and having means thereon engageable with adjacent portions of said arms when the lower end portions of said arms are in the spaced apart position, and handle means carried by said container adjacent the other end thereof.

2. A mobile carrier for traversing a ground surface comprising a container, at least two spaced upstanding arms arranged below said container intermediate the ends thereof and each having the upper end connected to said container for pivotal movement about a vertical axis and each having the lower end portion positioned contiguous to the adjacent side of said container intermediate the ends thereof, said lower end portions being spaced apart, a wheel journaled in the lower end portions of said arms and movable with said lower end portions from the spaced apart position contiguous to the sides of said container to a juxtaposed position adjacent one end of the latter, holding means carried by said container intermediate the ends thereof for holding the lower end portions of said arms in the spaced apart position or in the juxtaposed position, said holding means comprising a bar arranged transversely of and carried by the under surface of said container adjacent said one end thereof and having means thereon engageable with adjacent portions of said arms when the lower end portions of said arms are in the juxtaposed position, and another bar arranged transversely of and carried by the under surface of said container and having means thereon engageable with adjacent portions of said arms when the lower end portions of said arms are in the spaced apart position, and handle means carried by said container adjacent the other end thereof, said handle means including a pair of longitudinally extending rods arranged in side by side abutting relation below said container with one end of each of said rods connected pivotally to the under surface of said container for swinging movement about a vertical axis from the side by side abutting position to a diverging position.

3. A mobile carrier for traversing a ground surface comprising a container, at least two spaced upstanding arms arranged below said container intermediate the ends thereof and each having the upper end connected to said container for pivotal movement about a vertical axis and each having the lower end portion positioned contiguous to the adjacent side of said container intermediate the ends thereof, said lower end portions being spaced apart, a wheel journaled in the lower end portions of said arms and movable with said lower end portions from the spaced apart position contiguous to the sides of said container to a juxtaposed position adjacent one end of the latter, holding means carried by said container intermediate the ends thereof for holding the lower end portions of said arms in the spaced apart position or in the juxtaposed position, said holding means comprising a bar arranged transversely of and carried by the under surface of said container adjacent said one end thereof and having means thereon engageable with adjacent portions of said arms when the lower end portions of said arms are in the juxtaposed position, and another bar arranged transversely of and carried by the under surface of said container and having means thereon engageable with adjacent portions of said arms when the lower end portions of said arms are in the spaced apart position, handle means carried by said container adjacent the other end thereof, said handle means including a pair of longitudinally extending rods arranged in side by side abutting relation below said container with one end of each of said rods connected pivotally to the under surface of said container for swinging movement about a vertical axis from the side by side abutting position to a diverging position, and other holding means carried by the under surface of said container intermediate the ends thereof and provided with grooves selectively engageable with complemental means on said rods for holding said rods in the side by side position or in the diverging position.

4. A mobile carrier for traversing a ground surface comprising a container, at least two spaced upstanding arms arranged below said container intermediate the ends thereof and each having the upper end connected to said container for pivotal movement about a vertical axis and each having the lower end portion positioned contiguous to the adjacent side of said container intermediate the ends thereof, said lower end portions being spaced apart, a wheel journaled in the lower end portions of said arms and movable with said lower end portions from the spaced apart position contiguous to the sides of said container to a juxtaposed position adjacent one end of the latter, holding means carried by said container intermediate the ends thereof for holding the lower end portions of said arms in the spaced apart position or in the juxtaposed position, said holding means comprising a bar arranged transversely of and carried by the under surface of said container adjacent said one end thereof and having means thereon engageable with adjacent portions of said arms when the lower end portions of said arms are in the juxtaposed position, and another bar arranged transversely of and carried by the under surface of said container and having means thereon engageable with adjacent portions of said arms when the lower end portions of said arms are in the spaced apart position, handle means carried by said container adjacent the other end thereof, said handle means including a pair of longitudinally extending rods arranged in side by side abutting relation below said container with one end of each of said rods connected pivotally to the under surface of said container for swinging movement about a vertical axis from the side by side abutting position to diverging position, and other holding means carried by the under surface of said container adjacent the other end thereof and selectively engageable with means on said rods for holding said rods in the side by side position or in the diverging position, said other holding means comprising a bar arranged transversely of and carried by the under surface of said container adjacent said other end thereof and having means thereon engageable with adjacent portions of said rods when the rods are in said side by side position or in said diverging position.

References Cited in the file of this patent

UNITED STATES PATENTS

| | | |
|---|---|---|
| 241,148 | Marsh | May 10, 1881 |
| 676,163 | Victor | June 11, 1901 |
| 1,243,432 | Lemke | Oct. 16, 1917 |
| 1,560,802 | Julstedt | Nov. 10, 1925 |
| 1,955,463 | Lathrop | Apr. 17, 1934 |
| 2,471,462 | Toth | May 31, 1949 |
| 2,494,199 | Provitola et al. | Jan. 10, 1950 |
| 2,588,503 | Dwyer | Mar. 11, 1952 |